US012307453B2

(12) United States Patent
Jivanyan et al.

(10) Patent No.: US 12,307,453 B2
(45) Date of Patent: May 20, 2025

(54) CRYPTOGRAPHIC ENCRYPTION PROTOCOL FOR DATA TYPES AND VALUES

(71) Applicant: Polymath Inc., St. Thomas (BB)

(72) Inventors: Aram Jivanyan, Yerevan (AM); Jesse Lancaster, Georgina (CA)

(73) Assignee: Polymath Inc., St. Thomas (BB)

( * ) Notice: Subject to any disclaimer, the term of this patent is extended or adjusted under 35 U.S.C. 154(b) by 497 days.

(21) Appl. No.: 17/121,103

(22) Filed: Dec. 14, 2020

(65) Prior Publication Data

US 2022/0020018 A1    Jan. 20, 2022

Related U.S. Application Data

(60) Provisional application No. 62/983,452, filed on Feb. 28, 2020.

(51) Int. Cl.
| | |
|---|---|
| *G06Q 20/40* | (2012.01) |
| *G06F 16/27* | (2019.01) |
| *G06Q 20/36* | (2012.01) |
| *G06Q 20/38* | (2012.01) |
| *H04L 9/06* | (2006.01) |
| *H04L 9/30* | (2006.01) |
| *H04L 9/32* | (2006.01) |
| *H04L 9/00* | (2022.01) |

(52) U.S. Cl.
CPC .......... *G06Q 20/401* (2013.01); *G06F 16/27* (2019.01); *G06Q 20/36* (2013.01); *G06Q 20/3829* (2013.01); *H04L 9/0618* (2013.01); *H04L 9/3073* (2013.01); *H04L 9/3218* (2013.01); *H04L 9/3239* (2013.01); *H04L 9/50* (2022.05)

(58) Field of Classification Search
CPC .. G06Q 20/401; G06Q 20/36; G06Q 20/3829; G06F 16/27; H04L 9/0618; H04L 9/3073; H04L 9/3218; H04L 9/3239; H04L 9/50
USPC ......................................................... 705/71
See application file for complete search history.

(56) References Cited

U.S. PATENT DOCUMENTS

| | | | |
|---|---|---|---|
| 11,146,399 B2* | 10/2021 | Westland et al. | |
| 2019/0109712 A1* | 4/2019 | Blass et al. | |
| 2019/0363871 A1* | 11/2019 | Cheon | |
| 2019/0370792 A1* | 12/2019 | Lam | |
| 2020/0034834 A1* | 1/2020 | Li et al. | |
| 2020/0311695 A1* | 10/2020 | Cao et al. | |
| 2021/0049594 A1* | 2/2021 | Liu et al. | |

(Continued)

OTHER PUBLICATIONS

Goldwasser et al.; Proof of Paintext Knowledge for the Ajtai-Dwork Cryptosystem (Year: 2005).*

*Primary Examiner* — James D Nigh
*Assistant Examiner* — Yin Y Choi
(74) *Attorney, Agent, or Firm* — Perkins Coie LLP; Colin Fowler; Benjamin Desch

(57) ABSTRACT

Disclosed herein is a means that takes advantage of the immutable security provided by blockchain data structures and further implements measures that enable data in blockchain records to remain private to their respective users via the use of multiple ciphertexts that are subjected to zero-knowledge proofs and manipulated homomorphically. Ciphertexts make use of cryptographic key pair encryption where participants make use of public keys to encrypt data intended for one another alone.

17 Claims, 18 Drawing Sheets

(56) References Cited

U.S. PATENT DOCUMENTS

| | | |
|---|---|---|
| 2021/0058230 A1* | 2/2021 | Zhang et al. |
| 2021/0058253 A1* | 2/2021 | Ma et al. |
| 2022/0138707 A1* | 5/2022 | Makrides et al. |
| 2022/0141021 A1* | 5/2022 | Makrides et al. |

* cited by examiner

4.1 Proof of knowledge of the encrypted value

The non-interactive zero-knowledge proof for value encryption proves the knowledge of value $v$ encrypted by a twisted El-Gamal ciphertext $(X,Y)$ under the public key $pk$. More formally, we define the language $L_{enc}$ as $$L_{enc} = \{(pk,(X,Y)) | \exists r, v \text{ s.t. } X = pk^r \wedge Y = g^v h^r\}$$

For a given instance $(pk,(X,Y))$ of public key and an twisted El-Gamal ciphertext, the protocol $\sum_{equal}$ proves that $(pk,(X,Y)) \in L_{enc}$.

Sigma-protocol for $L_{equal}$. On the given statement $x = (pk,(X,Y))$, the prover $P$ and verifier $V$ engage into the following steps:

1. $P$ selects random values $a, b \xleftarrow{R} Z_p$
2. $P$ computes $A = pk^a$ and $B = h^b g^a$ and sends to $V$
3. $V$ sends a random challenge value $x \xleftarrow{} (0,1)^\lambda$
4. $P$ computes $z_1 = a + xr$ and $z_2 = b + xv$ and sends $z_1, z_2$ to $P$
5. $V$ accepts the final proof if and only if
   - $(pk)^{z_1} = A \cdot X^x$
   - $h^{z_2} g^{z_1} = B \cdot Y^x$ Let's denote the NIZKPoK for $L_{enc}$ as $\pi_{enc}$. $\pi_{enc}$ can be obtained by applying the Fiat-Shamir transform to the $\sum_{enc}$.

*FIG. 14A (Prior Art)*

4.2 Proof of correct encryption of the given value

The non-interactive zero-knowledge proof for the value encryption proves the twisted El-Gamal ciphertext $(X, Y)$ correctly encrypts the public value $v$ under the public key $pk$ without revealing the randomness or the corresponding private key. More formally, we define the language $L_{correct}$ as $$L_{correct} = \{(pk, v, (X, Y)) \mid \exists r \text{ s.t. } X = pk^r \wedge Y = h^v g^r\}$$

For a given instance $(pk, v, (X, Y))$ of a public key, message and an twisted El-Gamal ciphertext, the protocol $\Sigma_{correct}$ proves that $(pk, v, (X, Y)) \in L_{correct}$.

Sigma-protocol for $L_{correct}$. On the given statement $x = (pk, v, (X, Y))$, the prover $P$ and verifier $V$ engage into the following steps:

- Both $P$ and $V$ homomorphically subtract the value $v$ from the value $Y = h^v g^r$ and compute the value $Y' = \frac{Y}{h^v}$
- Prover proves the discrete logarithm equality of elements $X$ and $Y'$ with respect to the generators $pk$ and $g$ through the following steps.

1. $P$ selects $u \xleftarrow{R} Z_P$
2. $P$ computes $A = pk^u$ and $B = g^u$ and sends $A, B$ to the $V$
3. $V$ sends a random challenge value $x \xleftarrow{} (0,1)^\lambda$
4. $P$ computes $z = u + x \cdot r$
5. $V$ accepts the final proof if and only if
   - $(pk)^z = A \cdot X^x$
   - $g^z = B \cdot Y'^x$ Let's denote the NIZKPoK for $L_{correct}$ as $\pi_{correct}$. $\pi_{correct}$ can be obtained by applying the Fiat-Shamir transform to the $\Sigma_{correct}$.

*FIG. 14B (Prior Art)*

4.3 Proof of two ciphertext encrypting the same value under the same public key This non-interactive zero-knowledge proof proves two El-Gamal ciphertexts $(X_1, Y_1)$ and $(X_2, Y_2)$ are encoding the same value under the given public key $pk$.

More formally, we define the language $L_{equal}$ as $$L_{value} = \left\{ \left( pk, (X_1, Y_1), (X_2, Y_2) \right) \middle| \exists v, r_1, r_2 \text{ s.t. } \left( X_1 = pk^{r_1}, Y_1 = h^v g^{r_1} \right) \wedge \left( X_2 = pk^{r_2}, Y_2 = h^v g^{r_2} \right) \right\}$$

Note that in this context the prover does not necessarily knows the randomnesses $r_1$ and/or $r_2$ used to comprise these ciphertexts. This algorithm uses the secret key $sk$ as a witness based on the observation that proving that ciphertexts $(X_1, Y_1)$ and $(X_2, Y_2)$ encode the same message under the same public key is equivalent to proving that $$\log_{Y_1 \frac{X_1}{Y_2} X_2} = \log_g pk = sk. \tag{1}$$

For a given instance $\left( pk, (X_1, Y_1), (X_2, Y_2) \right)$ of a public key and two twisted El-Gamal ciphertexts, the protocol $\Sigma_{equal}$ proves that $\left( pk, (X_1, Y_1), (X_2, Y_2) \right) \in L_{equal}$.

Sigma-protocol for $L_{equal}$. On the given statement $\left( pk, (X_1, Y_1), (X_2, Y_2) \right)$, the prover $P$ and verifier $V$ engage into the following steps:

- Both $P$ and $V$ compute the values $X = \frac{X_1}{X_2} = pk^{r_1 - r_2}$ and $Y = \frac{Y_1}{Y_2} = g^{r_1 - r_2}$.

- Prover proves the discrete logarithm equality of elements $X$ and $pk$ with respect to the generators $Y$ and $g$ through the following steps.

1. $P$ selects $u \xleftarrow{R} Z_P$
2. $P$ computes $A = Y^u$ and $B = g^u$ and sends $A, B$ to the $V$
3. $V$ sends a random challenge value $x \xleftarrow{R} (0,1)^\lambda$
4. $P$ computes $z = u + x \cdot sk$
5. $V$ accepts the final proof if and only if
   - $Y^z = A \cdot X^x$
   - $g^z = B \cdot pk^x$ Let's denote the NIZKPoK for $L_{equal}$ as $\pi_{equal}$ which can be obtained by applying the Fiat-Shamir transform to the $\Sigma_{correct}$.

*FIG. 14C*
*(Prior Art)*

4.4 Proof of two ciphertexts encrypting the same value under different public keys This non-interactive zero-knowledge proof proves two El-Gamal ciphertexts $(X_1, Y_1)$ and $(X_2, Y_2)$ are encoding the same value under two given public keys $pk_1$ and $pk_2$. More formally, we define the language $L_{cipher}$ as $$L_{cipher} = \left\{ \left(pk_1, pk_2, (X_1, Y_1), (X_2, Y_2)\right) \middle| \exists v, r_1, r_2 \text{ s.t. } \left(X_1 = pk_1^{r_1}, Y_1 = h^v g^{r_1}\right) \wedge \left(X_2 = pk_2^{r_2}, Y_2 = h^v g^{r_2}\right) \right\}$$

As discussed in [2], the same randomness $r$ can be re-used when encrypting the same message for different recipients. In the most cases of our payment system context the language $L_{cipher}$ can be defined as $$L_{cipher} = \left\{ \left(pk_1, pk_2, X_1, X_2, Y\right) \middle| \exists v, r \text{ s.t. } X_1 = pk_1^r, X_2 = pk_2^r \wedge Y = h^v g^r \right\}$$

For a given instance $(pk_1, pk_2, X_1, X_2, Y)$ the protocol $\sum_{cipher}$ proves that $(pk_1, pk_2, X_1, X_2, Y) \in L_{cipher}$.

Sigma-protocol for $L_{cipher}$. The sigma protocol is comprised of three algorithms $\sum_{correct} = (Setup, Prove, Verify)$. The $Setup$ algorithm is the same discussed in the context of $\sum_{correct}$. On the given statement $(pk_1, pk_2, X_1, X_2, Y)$, the prover $P$ and verifier $V$ engage into the following steps:

- $P$ selects $a, b \xleftarrow{R} Z_P$
- $P$ computes $A_1 = pk_1^a$, $A_2 = pk_2^a$ and $B = h^b g^a$ and sends the values $A_1, A_2, B$ to the $V$
- $V$ sends a random challenge value $x \xleftarrow{R} (0,1)^\lambda$
- $P$ computes $z_1 = a + x \cdot r$ and $z_2 = b + x \cdot v$ and sends $z_1, z_2$ to $V$.
- $V$ accepts the final proof if and only if
  - $pk_1^{z_1} = A_1 X_1^x$
  - $pk_2^{z_1} = A_2 X_2^x$
  - $g^{z_1} h^{z_2} = B Y^x$

*FIG. 14D (Prior Art)*

CRYPTOGRAPHIC ENCRYPTION PROTOCOL FOR DATA TYPES AND VALUES

CROSS-REFERENCE TO RELATED APPLICATIONS

This application claims priority to U.S. Provisional Application No. 62/983,452, titled "CRYPTOGRAPHIC ENCRYPTION PROTOCOL FOR DATA TYPES AND VALUES," and filed Feb. 28, 2020, which is incorporated by reference hereto.

TECHNICAL FIELD

The disclosure relates to techniques for cryptographically securing and confidential data that is stored publicly. issuing and managing digital assets of multiple types on the public ledgers. Discussed herein are techniques which enable users to transact privately while keeping both the transferred amounts and their corresponding asset types confidential.

BACKGROUND

Blockchain-based, smart contract platforms have great promise to remove trust and add transparency to distributed applications. Blockchain systems record all assets and transactions, and all transactions can be verified by any entity, making the whole system open and transparent. But this transparent nature of the blockchain systems is also results in a significant privacy cost. Existing blockchains offer complete visibility over all user accounts, the transaction amounts and their corresponding asset types.

BRIEF DESCRIPTION OF THE DRAWINGS

FIGS. 14A-D illustrate the cryptographic zero-knowledge proof mechanisms used in the system algorithm construction.

DETAILED DESCRIPTION

Figure 1:
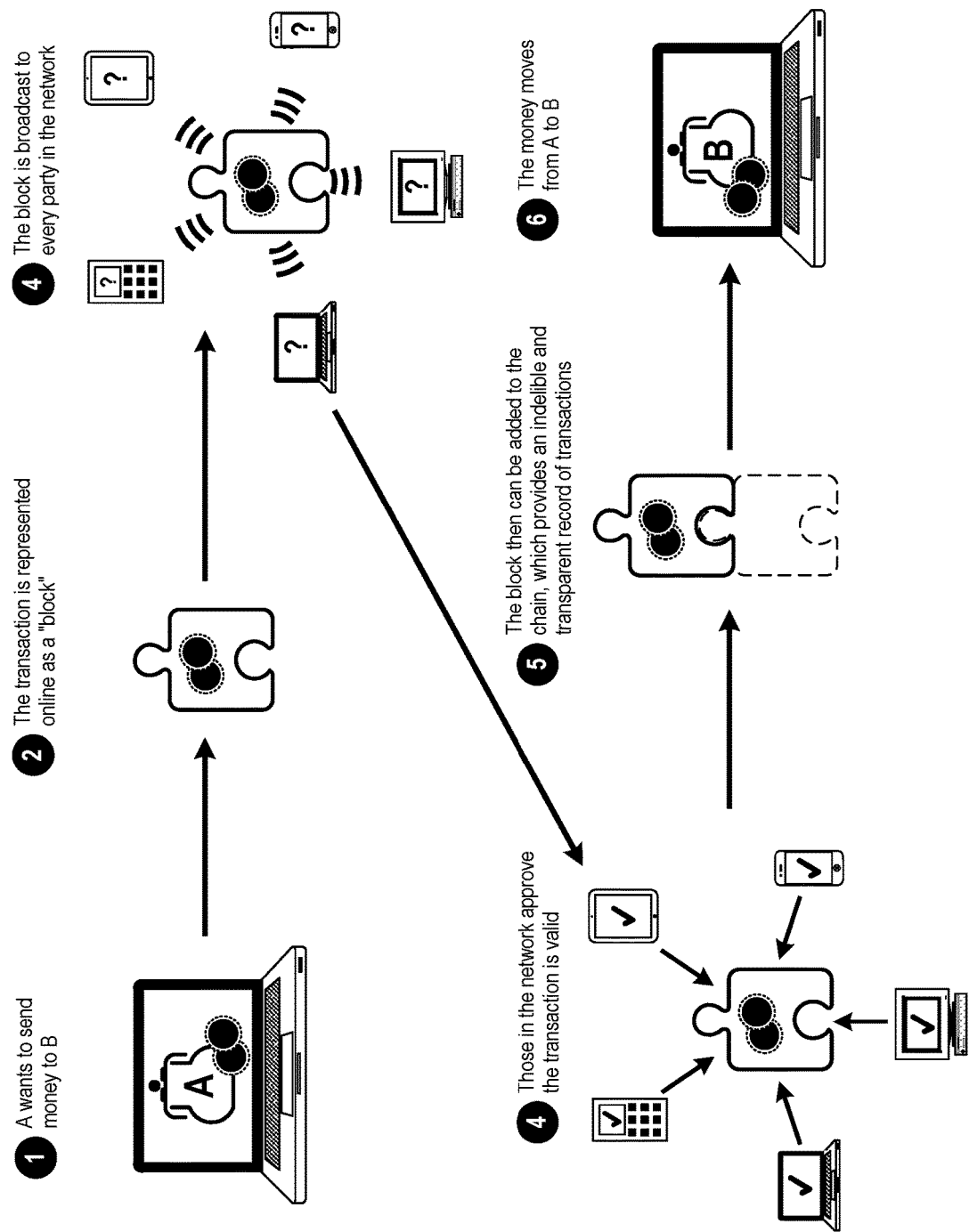
FIG. 1 is a block diagram of a known blockchain data structure.

Market makers and businesses need financial privacy, in particular, they need their positions and trades to remain confidential. While different cryptographic systems help to enhance the confidentiality over smart-contract platforms and enable private transaction methods which are concealing the user account balances and/or their transactions amounts on the blockchain, these systems are operating in the single-asset setup which is restricting the users to only transact over some publicly known asset type.

Described herein are cryptographic methods and a confidential transaction system which supports multiple asset types within the same application setup. System users can maintain accounts of different asset types and transact privately among these accounts by hiding both the transaction type and its amounts. This system retains public verifiability that no assets are created or destroyed during the transaction without revealing any other information about the transferred funds.

Some embodiments of this system are extended further to support not only the confidentiality of asset types and amounts, but also support anonymous transactions which hides the identities of the transacting parties.

The system maintains a platform smart contract, which stores a set of records corresponding to user accounts (account record) and a set of transactions. This set of all user accounts and transactions is collectively representing the state of a platform smart contract in a blockchain network.

Each account in the system is associated with its owner identity, an account type and a balance. In the system, each user account is comprised of: a cryptographic key pair including a public key and a private key, and a pair of ciphertexts both encrypted under this account public key. The owner of the corresponding private key can control and manage the account by wiring or accepting incoming transactions. Each account record also contains other cryptographic material which proves that both the public key and also the pair of ciphertexts are well-formed and valid.

In some embodiments, each user account is associated also with other auxiliary information, such as a numerical counter data record to count all wired and incoming transactions.

The first account level ciphertext for a given user account record encodes the account balance. For the newly created accounts, the balance is empty so the first ciphertext should encode zero. A cryptographic proof that the ciphertext is well-formed and is encoding 0 is provided through zero-knowledge proof techniques and added to the account record. Various known zero-knowledge proofs may be utilized, though a passable selection is depicted in the FIG. 14 series.

The first ciphertext changed/updated upon each incoming or outgoing confidential transaction as will be detailed below through corresponding figures. The first ciphertext is updated when new assets of the corresponding account types are issued by the account owner.

The second account level ciphertext for a given user account corresponds to the account type and is encoding the corresponding asset type identifier. The asset type identifier refers to the type of asset the given user has in their wallet. Using the example of security tokens, the asset type may refer to an ownership share in a given corporate entity. A cryptographic proof that the ciphertext is well-formed and is encodes a valid asset identifier is generated through special zero-knowledge proof techniques and is added to the account record. Encryption of plaintext to ciphertext may include the use of nonces or salt values that prevent reverse identification of the plaintext via guesswork.

The second ciphertext is generated during the account creation and is not changed/updated further. In some embodiments, a user accounts may refer to multiple asset types (e.g., security tokens in both entity A and entity B). In such circumstances, the user account is associated with a number of additional pairs ciphertexts, each referring to an amount of a given asset.

An asset issuance transaction is conducted to cause the account balance increment. Asset Issuance Transaction is conducted by the account owner by generating an operand ciphertext which encodes the confidential amount of newly created assets.

In some embodiments, the asset issuance transaction is validated/approved by trusted mediators. In order to approve the transaction, the trusted mediator needs to have access to the confidential amount of the new issued funds. The user (the owner of the account) is encrypting the amount and asset type of new issued funds by the trusted mediator's public key in order to privately share the number of newly issued assets with the mediator.

Cryptographic proofs are generated through zero-knowledge proof techniques and added to the asset issuance transaction record to show the well-formedness of corresponding ciphertexts. Trusted mediators may approve the asset issuance transaction by cryptographically signing the transaction record (e.g., via a private key).

An approved asset issuance transaction is processed by the system smart contract. After processing, the user account balance will be confidentially incremented by adding the transaction operand ciphertext to the first ciphertext of the user account (e.g., either via homomorphic encryption or by adding the plaintext values together and encrypting the new value to replace the old).

A similar process enables a confidential transaction that transfers funds from a first account to a second account. A confidential transaction is comprised of two steps. At first, a transaction is initialized by the first user and next, the initialized confidential transaction is finalized by the second user.

Initialization of the confidential transaction by the first account owner involves generating three operand ciphertexts and zero-knowledge cryptographic proofs along with other auxiliary operations. In some embodiments, different users generate the operands (e.g., the second user may generate one or more of the operands). The first operand ciphertext encrypts the transaction amount using the first user's public key.

The second operand ciphertext encrypts the transaction amount with the second user public key. The transaction amount remains confidential for all network participants except the second user. The second user is able to use their private key to decrypt the second operand ciphertext because the second operand ciphertext was encrypted using the second user's public key. The relationship between the public and private keys enables decryption.

The third operand ciphertext encrypts the transferred asset type with the second user's public key. Along with the three operand ciphertexts, the first user generates zero-knowledge proofs to prove that 1. The first operand ciphertext is encoding a non-negative amount.
2. The first user account balance remains non-negative after the transferred funds will be deducted from the first user account balance (to prove overdraft-safety).
3. The third operand ciphertext is encrypting the same asset identifier, as the second ciphertext of the first user account. This proves the transfer types corresponds to the origin account type.

The second user finalizes the confidential transaction by generating a proof that the third operand ciphertext is encrypting the same asset identifier as the second account level ciphertext of the second user account. The second user's proof demonstrates that the transfer type corresponds to the destination account type.

Once fully verified and accepted, these proofs jointly prove that the transfer has happened between two accounts of the same type, and no assets have been created or destroyed at the result of the transaction.

A finalized confidential transaction is executed by the system smart contract. After execution, the first user account balance will be decreased by subtracting the first operand ciphertext from the first account level ciphertext of the first user account (e.g., homomorphic encryption or by subtracting plaintext values and encrypting the new value). The second user account balance is incremented by adding the second operand ciphertext to the first ciphertext of the user account (e.g., homomorphic encryption or by adding plaintext values and encrypting the new value).

A confidential transaction can be reversed upon the approval of some parties. A transaction reversal does not need any interaction from the transaction sender (first user) or recipient (second user).

A system smart contract can reverse the confidential transaction by adding the confidential transaction first operand ciphertext to the first ciphertext of the first user and subtracting the second operand ciphertext from the first ciphertext of the second user.

An executed interaction is recorded on the system smart contract (in turn recorded on an immutable public ledger, blockchain structure). The record of the transaction is entirely through ciphertexts, and user accounts are represented by ciphertexts. No unauthorized user is able to decrypt the ciphertexts and determine the content of the transaction. Zero-knowledge proofs enable the system to execute the cryptographic interactions without having plaintext values to perform calculations on.

To achieve anonymity by hiding the transacting parties, in addition to updating the first and second accounts, the third account can be updated by adding another (fourth) operand ciphertext to the first ciphertext of the third account, the later operand ciphertext being generated by encrypting zero using the third accounts public key.

The emergence of Cryptocurrency as a deregulated currency has posed problems for regulatory bodies such as the United States Government. In some circumstances, it behooves users to cooperate with regulatory bodies. In those circumstances, the distributed nature of the cryptographic coins impedes the ability to comply. Thus, there is a need to implement a cryptographic coin that retains many of the benefits of the distributed system but includes data structures that enable compliance with regulatory agencies and serve as a security.

Structurally, in some embodiments, customized, flexible cryptographic tokens connected to a smart contract are powered by a less flexible, base cryptocurrency. Miners operating on the network for the base cryptocurrency power execution of a distributed application (dApp) or smart contract. The smart contract is held by an administrative user and includes all of the custom cryptographic tokens. The custom cryptographic tokens do not "move" in the same sense that the base cryptocurrency moves via transactions. The smart contract is "held" by the administrative user though secondary users may interact with the smart contract and various portions (specific tokens) may be attributed to those secondary users.

Where the smart contract remains in the control of the administrative user, the administrative user is able to implement changes to the custom cryptographic token unilaterally. Changes include implementing secondary transfer restrictions, as well as implementing software updates and new functionality on an otherwise distributed system. The cryptographic relationship of different entities interacting with the smart contract data structure enables useful functionality not previously available in cryptocurrency systems.

As a platform, a provider may generate smart contracts to distribute to a plurality of administrative users. Each smart contract corresponds to a unique custom cryptographic token. Once created and given to an administrative user, the platform provider loses control of the customizability of the token. Software updates and feature adds are taken at the discretion of the administrative user.

The platform provider uses a blockchain-based protocol that provides a suite of tools to coordinate and incentivize participants to collaborate and launch financial products on the blockchain. By creating a standard token protocol which embeds defined requirements into the tokens themselves, these tokens can only be purchased and traded among verified participants.

FIG. 1 is a block diagram of a known blockchain data structure. Cryptocurrency networks operate on a distributed network architecture. Key to understanding cryptocurrency is the data structure upon which the network operates. For example, the Bitcoin and Ethereum networks use a data structure referred to as a blockchain.

The blockchain includes a history of all transactions that have ever occurred on the network. Each full node in the distributed network holds a full copy of the blockchain. To participate in the network at all, the blockchain history must be consistent with the history of at least a majority of other nodes. This consistency rule has an important effect of causing the blockchain to be immutable. In order to effectively attack a blockchain, one must control 51%+ of the processing power of the entire network. Where the network is comprised of thousands of nodes, assembling the requisite 51% is exceedingly difficult. While it is true that many nodes often group together in pools that together work together to solve for nonces to propagate the blockchain, the grouped nodes of the pool do not necessarily share common control. While they have agreed to pay any mined coins to a central pot that is shared amongst the pool, this is far and away from agreeing to make changes to the blockchain.

When a given node intends to generate a transaction, the transaction is propagated throughout the nodes until it reaches a node or group of nodes that can assemble that transaction and other transactions generated during a contemporaneous period of time into a block. Until a transaction appears in a block it is not published or public. Often a transaction isn't considered confirmed until 6 additional blocks have been added.

At the time of this filing, Bitcoin blocks are limited to the size of 1 MB and are generated approximately every 10 to 15 minutes. This illustrates an important limitation of the Bitcoin network, that it only processes approximately 7 transactions per second. Conversely, Ethereum limits block size based on the amount of processing the contracts in the given block call for and are appended every 5 to 15 seconds. While cryptocurrency networks technically begin processing transactions in real-time, and the existence of a block including a given transaction verifies that transaction's authenticity, until that block is published to the blockchain, the transaction is not verified.

Gaps in verification time introduces the issue within the Bitcoin network at a given moment of "who has the money." During the 10 to 15-minute span between block generation transactions that have been submitted may not actually process. This would occur when a user spends money they didn't have, or double spends. This is not to say the network has no verification mechanism between blocks. For example, when a given user attempts to pay another user, the system may easily query older blocks to inspect the given user's balance as of at least the most recently published block. If the given user has sufficient funds, it is moderately safe to trust the transaction.

However, if the given user is attempting to double spend all their money, only one of those transactions will publish in the next block. The other will be rejected (which is rejected, and which processes is subject of a race condition and not necessarily dependent on time of generation). When discussing trivial amounts of money (e.g., paying for coffee), this is not really a big concern. However, when handling larger purchases that occur quickly (e.g. stock in a company), the amounts can become significantly greater, and a clearance time of 10-15 minutes is not ideal.

Thus far, Bitcoin has been discussed as a network for trading Bitcoins. However, Bitcoin transactions have additional utility in that they can embed additional data. As contemplated above, Bitcoin can be used to purchase and record the existence of data at a given point in time. Recording data is performed by including hashed data within an output field of a given transaction. In this manner, the proof of existence for any document or recorded data may be embedded into the immutable history of the blockchain.

Systems that utilize the Bitcoin blockchain to transfer the ownership of non-coin assets require software that is separate from and merely relies upon the immutability of the blockchain. The separate software is not necessarily secure or immutable itself. Extra-blockchain software is thus an inherent weak point in a system that relies upon the immutability of the blockchain to ensure security. Ethereum takes the ability to buy and sell non-coin assets a step further.

Ethereum smart contracts are in effect software that runs on the blockchain. That software is open source and subject to inputs that are related to the blockchain itself. Of course, one can still write code including vulnerabilities, but the platform enables greater security and fewer weak links in the chain. Note that Ethereum is not the only base system capable of executing smart contracts.

Figure 2:
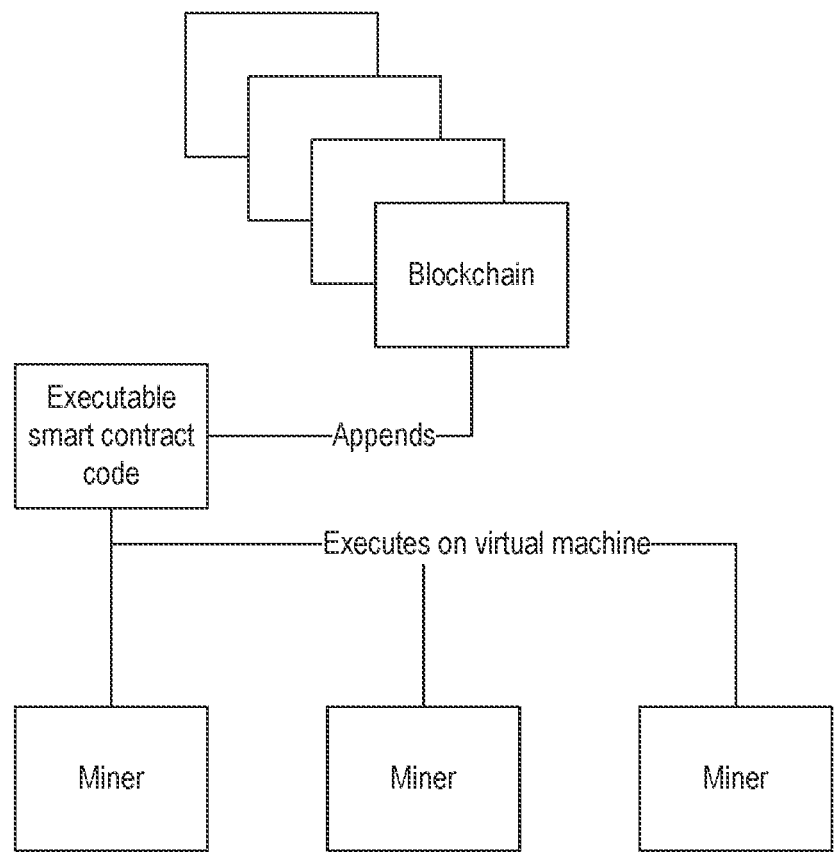
FIG. 2 is a block diagram illustrating a known data structure of a smart contract.

FIG. 2 is a block diagram illustrating a known data structure of a smart contract. Smart contracts and dApps execute on a virtual machine. Where smart contracts run on Ethereum, the virtual machine is the Ethereum virtual machine ("EVM"). The EVM is instantiated on available network nodes. Smart contracts and dApps are applications that execute; thus, the processing power to do so must come from hardware somewhere. Nodes must volunteer their processors to execute these operations based on the premise of being paid for the work in Ethereum coins, referred to as Ether, measured in "gas." Gas is the name for a unit of work in the EVM. The price of gas can vary, often because the price of Ether varies, and is specified within the smart contract/dApp.

Every operation that can be performed by a transaction or contract on the Ethereum platform costs a certain number of gas, with operations that require more computational resources costing more gas than operations that require few computational resources. for example, a multiplication instruction requires 5 gas, whereas an addition instruction requires 3 gas. Conversely, more complex instructions, such as a Keccak256 cryptographic hash requires 30 initial gas and 6 additional gas for every 256 bits of data hashed.

The purpose of gas is pay for the processing power of the network on execution of smart contracts at a reasonably steady rate. That there is a cost at all ensures that the work/processing being performed is useful and valuable to someone. Thus, the Ethereum strategy differs from the Bitcoin transaction fee, which is only dependent on the size in kilobytes of a transaction. Because Ethereum's gas costs are rooted in computations, even a short segment of code can result in a significant amount of processing performed. The use of gas further enforces incentivizes coders to generate efficient smart contracts/algorithms. Otherwise the cost of execution may spiral out of control. Unrestricted, an exponential function may bankrupt a given user.

While operations in the Ethereum virtual machine (EVM) have a gas cost, gas has a "gas price" measured in ether. Transactions specify a given gas price in ether for each unit of gas. The fixing of price by transaction enables the market to decide the relationship between the price of ether and the cost of computing operations (as measured in gas). The total fee paid by a transaction is the gas used multiplied by gas price.

If a given transaction offers very little in terms of a gas price, that transaction will have low priority on the network. In some cases, the network miners may place a threshold on the gas price each is willing to execute/process for. If a given transaction is below that threshold for all miners, the process will never execute. Where a transaction does not include enough ether attached (e.g., because the transaction results in so much computational work that the gas costs exceed the attached ether) the used gas is still provided to the miners. When the gas runs out, the miner will stop processing the transaction, revert changes made, and append to the blockchain with a "failed transaction." Failed transactions may occur because the miners do not directly evaluate smart contracts for efficiency. Miners will merely execute code with an appropriate gas price attached. Whether the code executes to completion or stalls out due to excessive computational complexity is of no matter to the miner.

Where a high gas price is attached to a transaction, the transaction will be given priority. Miners will process transactions in order of economic value. Priority on the Ethereum blockchain works similarly as with the Bitcoin blockchain. Where a user attaches more ether to a given transaction than necessary, the excess amount is refunded back to that user after the transaction is executed/processed. Miners only charge for the work that is performed. A useful analogy regarding gas costs and price is that the gas price is similar to an hourly wage for the miner, whereas the gas cost is like a timesheet of work performed.

A type of smart contract that exists on the Ethereum blockchain are ERC-20 tokens (Ethereum Request for Comment-20). ERC-20 is a technical specification for fungible utility tokens. ERC-20 defines a common list of rules for Ethereum tokens to follow within the larger Ethereum ecosystem, allowing developers to accurately predict interaction between tokens. These rules include how the tokens are transferred between addresses and how data within each token is accessed. ERC-20 provides a framework for a means to build a token on top of a base cryptocurrency. In some embodiments herein, enhancements are built on top of the ERC-20 framework, though use of the ERC-20 technical specification is not inherently necessary and is applicable to circumstances where Ethereum is used as the base cryptocurrency.

Thus far discussion has been focused around Bitcoin and Ethereum. As applicable in this disclosure, these are base cryptocurrencies. Other base cryptocurrencies exist now and in the future. This disclosure is not limited to application on specifically the Bitcoin or Ethereum blockchains.

A custom cryptographic token as described in this disclosure (hereafter, "custom token") described herein shares many of the characteristics of both fungible (ERC-20) and non-fungible tokens (ERC-721). Custom tokens may be designed to represent complete or fractional ownership interests in assets and/or entities. While utility tokens have no limitations on who can send or receive the token, custom tokens are subject to many restrictions based on identity, jurisdiction and asset category.

The concept of utility tokens is understood in the blockchain space today. Utility tokens represent access to a network, and a give utility token purchase represents the ability to buy goods or services from that network—for example, an arcade token allows users to play an arcade game machine. Utility tokens give users that same type of access to a product or service. On the other hand, custom tokens represent complete or fractional ownership in an asset (such as shares in a company, a real-estate asset, artwork, etc.). Owning a stake in a company, real estate, or intellectual property can all be represented by custom tokens. Custom tokens offer the benefit of bringing significant transparency over traditional paper shares through the use of the blockchain and its associated public ledger. Custom token structure, distribution, or changes that could affect investors are now accessible to all via the blockchain.

Initial Coin Offerings

In some embodiments disclosed herein, private token interactions represent an equity stake in an organization, or a claim to the wealth generated by its activities. Sales or issuances of these tokens with these features tend to constitute a securities offering, which means that they are subject to securities regulations; issuers need to ensure that token sales comply with all applicable securities laws or risk severe penalties.

Traditional crypto coin apparatus at their core are focused on the efficient transferability of tokens. The focus on efficient transferability may be stifled by a regulatory apparatus that requires intermediaries and government filings of various kinds. In contrast to traditional Securities offerings, the general public still does not have a good grasp on the truly wide range of products and technology underlying the many tokens that technologists have created, and because securities regulators are still only beginning to think about developing rules for this space, regulatory bodies have temporarily resorted to issuing warnings. ICO investors are cautioned about the investment and enforcement risks of ICOs, and issuers—even pure coders who think they are just pushing blockchain's revolutionary technology advances to the next level—are reminded that they could be subject to securities laws despite their perception to the contrary. Regulators are applying increasing legal scrutiny towards token sales to ensure compliance where appropriate. Some ICOs have cancelled their offerings after discussions with regulators, while others face the risk of prosecution.

Figure 3:
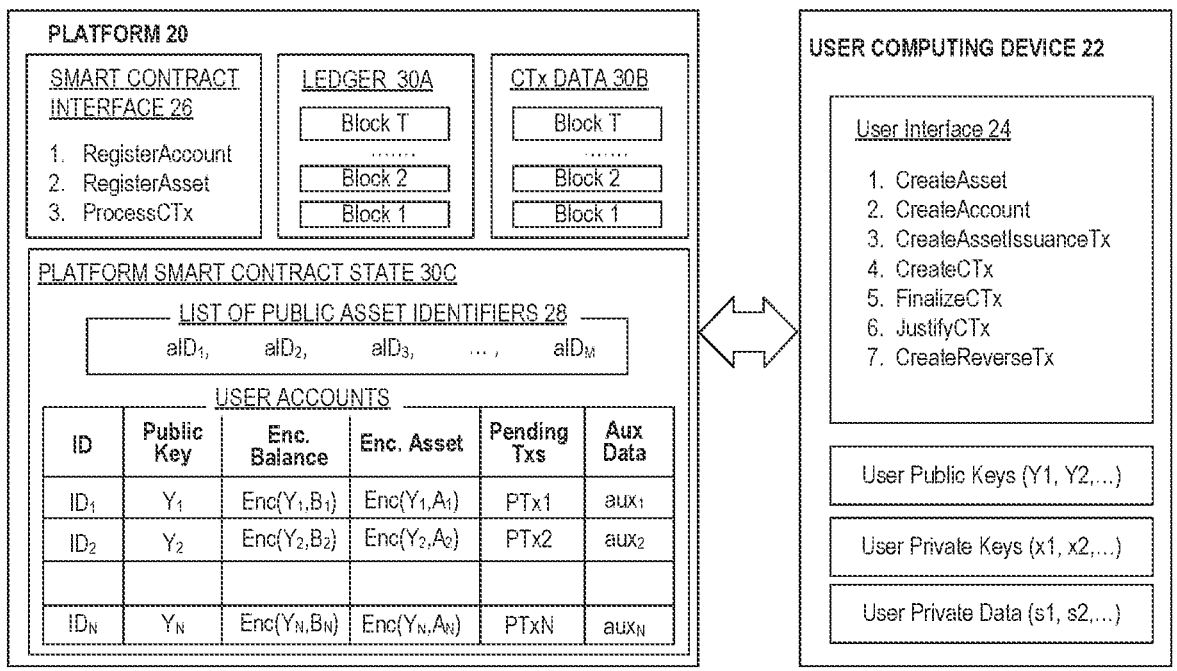
FIG. 3 is a block diagram that illustrates a confidential asset management system implementing a platform smart contract and user interfaces, according to some embodiments.

FIG. 3 is a diagram depicts some components of the private interaction platform 20, smart contract functions and the user computing device 22 providing a user interface 24. The user interface 24 implements the set of following seven functions: CreateAsset, CreateAccount, CreateAssetIssuaneTransaction, CreateCTx, FinalizeCTx, JustifyCTx. Tx is read as "transaction" and the capital C reads as "confidential."

The platform smart contract 20 in turn has a computational interface 26 that implements the following three functions: RegisterAccount, RegisterAsset and ProcessCTX.

The platform smart contract 20 maintains a public, immutable, append only ledger of all historically generated asset identifiers 28. The asset identifier is generated via the user CreateAsset function and is registered into the smart contract 20 via the RegisterAsset function. RegisterAsset function checks that the new created asset meets certain restrictions before registering it into the blockchain.

The platform smart contract 20 maintains a public, immutable, append only list of all historically generated user accounts via a smart contract state ledger 30. The state ledger 30 includes multiple components. Specifically, blockchain type ledgers 30A and a CTxData 30B that store the transactions and the data associated therewith, and Platform State data 30C that includes data records for each of the users on the platform. The user account is generated via the user CreateAccount function and is registered into the smart contract via the RegisterAccount function. RegisterAccount function may check the validity of the new generated user account (ex: by checking the cryptographic proofs and validating digital signatures linked to the new created account) before its registration.

Each user account has a unique identifier, which uniquely identifies the account in the system. Each account is associated with a user public key which indicates the ownership of account. The public key is shared with all participants of the system and the corresponding private key is used to generate and sign the confidential transactions linked to each respective account.

Each account is comprised of two ciphertexts that encrypt the account balance and the account asset type accordingly under the account's public key (in some embodiments further encryption variables are used in addition to the public key). The first ciphertext encrypting the account balance is a subject of change upon each incoming or outgoing transaction. The second ciphertext encrypts the account type and is generated at the moment of the account creation and is not modified thereafter.

Figure 4:
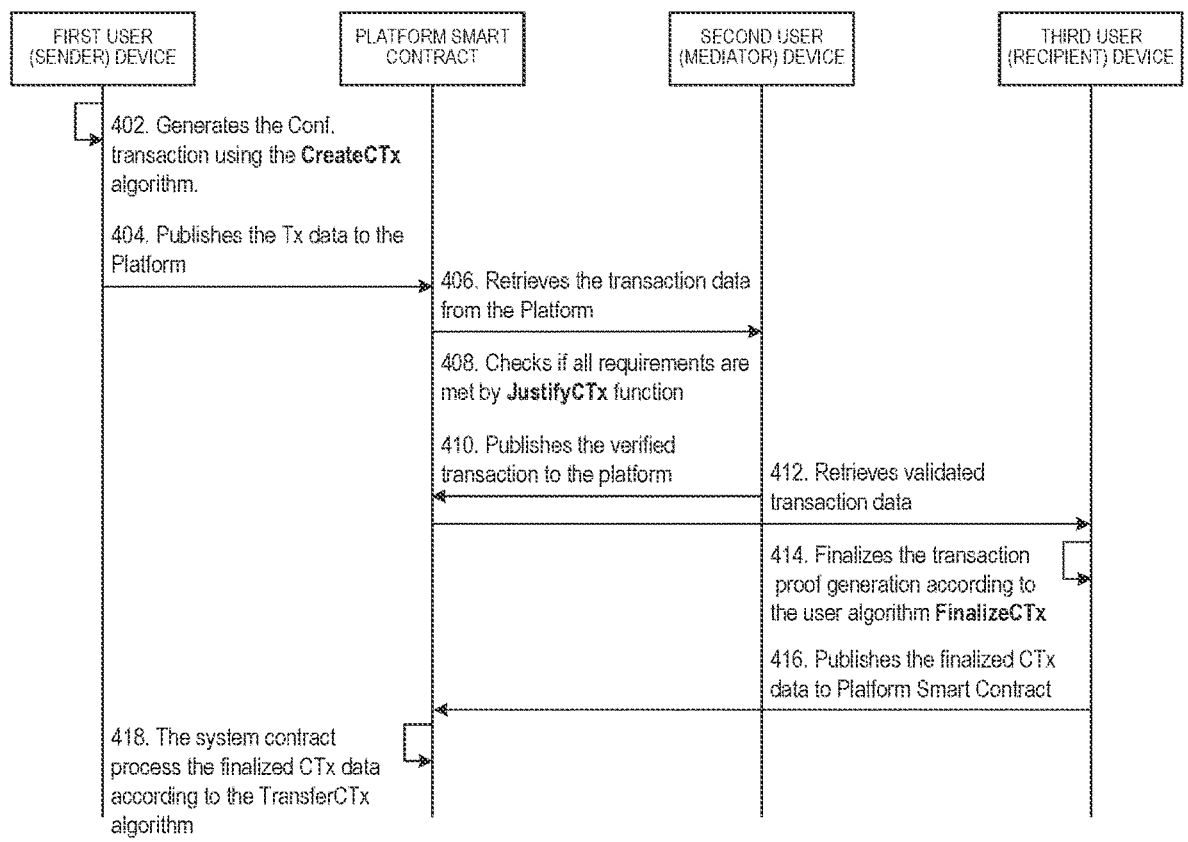
FIG. 4 is a process flow diagram of a transfer process for transacting in the platform, according to some embodiments.

FIG. 4 is an example sequence of steps for processing a new confidential transaction request which is first initialized by the first user who is the originator of the transaction and sends the funds, next verified by the second user who checks if all transaction restrictions are met, and then finalized by the third user who receives the transferred funds, includes the following steps.

At step 402, the first user running a client app generates confidential transaction data with the help of the user algorithm CreateCTx. The transaction data format and the details of the algorithmic steps are discussed in FIG. 9.

At step 404, the client app publishes the resulting transaction data to the blockchain. The transaction data is recorded by the system smart contract. Each transaction data is associated with a unique identifier, the first user public key, the second user public key, the third user public key.

At step 406, the second user (whom acts as the trusted mediator for the transaction) retrieves the transaction data published at step 404 from the system smart contract. At step 408, the second user checks the validity of the generated transaction data by calling the JustifyCTx user algorithm. The JustifyCTx function validates zero-knowledge proofs indicating that the transaction data (operands) are well-formed and correct. The output of the JustifyCTx algorithm is transaction data. The details of the JustifyCTx algorithm and the data are detailed in FIG. 11. The Second User also checks if certain transaction restrictions are met or not. For example, the transaction restrictions may include but not limited by certain requirements of the transferred fund amount to be within the allowed range, the recipient belonging to a certain list of allowed recipients. Limitations on recipient may be influenced by a "know your customer" (KYC) system.

At step 410, the second user publishes the signed transaction data to the blockchain. At step 412, the third user (whom is the intended recipient of the transaction) retrieves the transaction data published at step 410 from the system smart contract.

At step 414, the third user finalizes the generated transaction data by calling the FinalizeCTx user algorithm. The output of the FinalizeCTx algorithm is transaction data. The details of the FinalizeCTx algorithm and the data are detailed in FIG. 10.

As step 416, the third user is uses client device to publish the data to the system smart contract. The finalized transaction data is associated with the first user public key, the second user public key and the third user public key.

Figure 12:
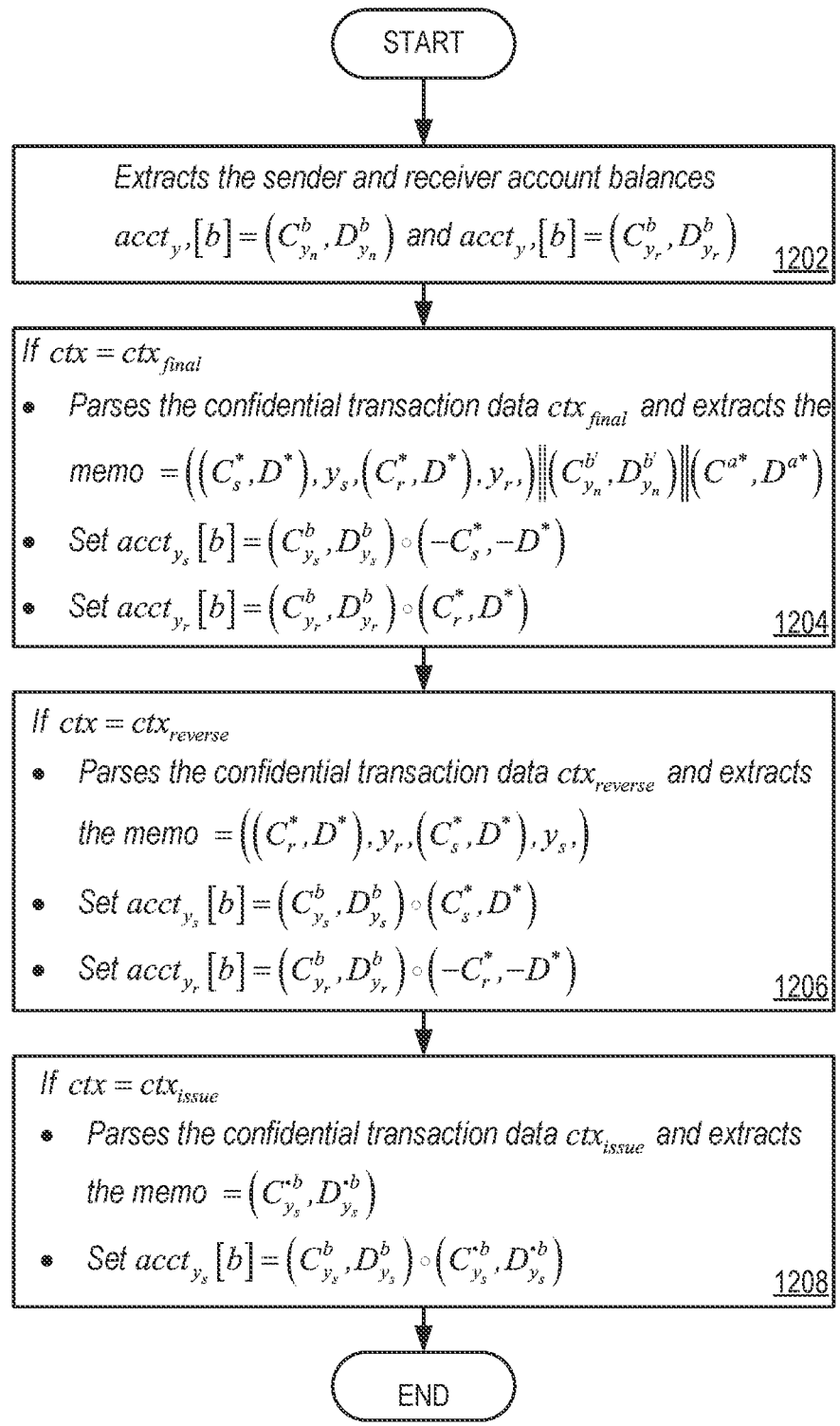
FIG. 12 is a flowchart that illustrates system algorithms ProcessCTx implemented in a platform smart contract to transfer a confidential transaction that hides the transferred asset amount and its asset type.

At step 418, the system contract processes the finalized transaction data according to the system algorithm TransferCTx. The details of the algorithm are depicted in FIG. 12.

Figure 5:
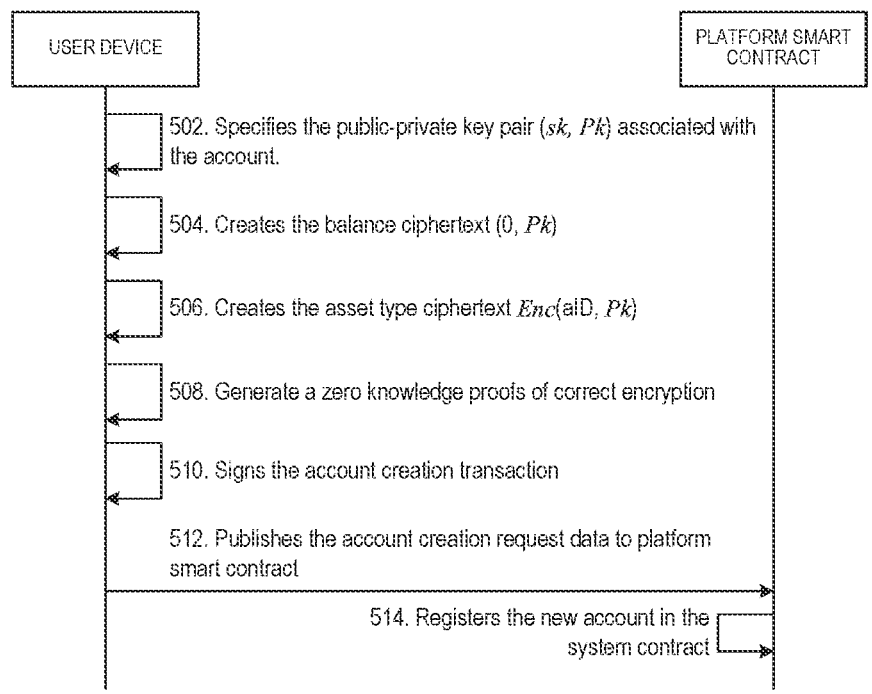
FIG. 5 is a process flow diagram of a new account generation process.

FIG. 5 illustrates an example sequence of steps for new account generation initiated by the user's client application running on the user client device and registered by the platform smart contract. At step 502, the user specifies the public key which will be publicly associated with the new created account. Note that the same public key can be associated with multiple accounts corresponding to different asset types.

At step 504, the user generates the first ciphertext which encrypts the account balance by using the account's corresponding public key. Each account balance is initially set to zero. In some embodiments, each account is uniquely associated with some asset type, which is registered in the system contract. In other embodiments, a given account may include multiple asset types and therefore have multiple account level ciphertexts associated therewith. At step 506, the user computes the second ciphertext which encrypts the corresponding asset identifier using the account's public key.

At step 508, the user generates non-interactive zero-knowledge proofs which proves that two ciphertexts generated at step 504 and 506 are valid, well-formed and the second ciphertext encodes a value from the list of all publishes asset identifiers. At step 510, the user signs the request data comprised of two ciphertexts, zero-knowledge proofs and other auxiliary information. At step 512, the client device publishes the signed request data to the system smart contract. At step 514, the system smart contract processes the request data by using the RegisterAccount algorithm.

Figure 6:
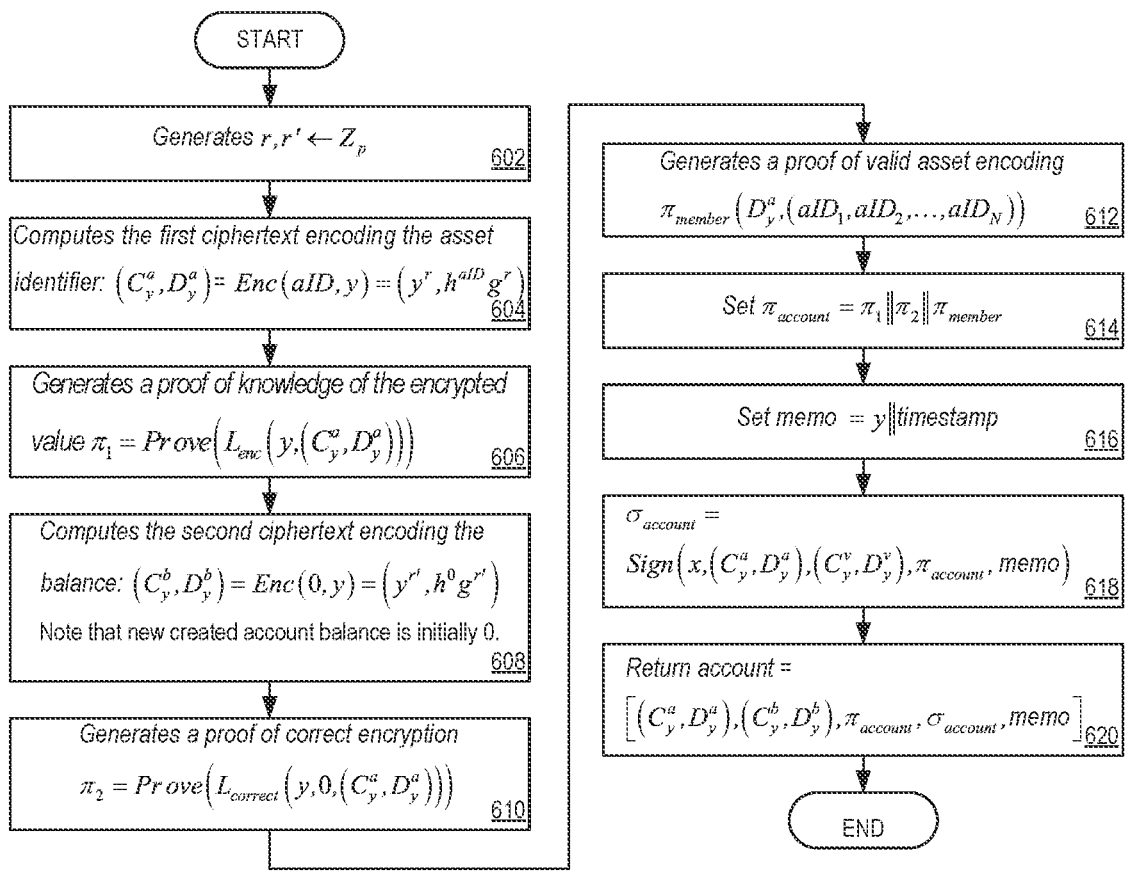
FIG. 6 is a flowchart that illustrates the user account generation algorithm CreateAccount to create new account setup request.

FIG. 6 illustrates the user algorithm CreateAccount used to generate a new account registration request data. The process takes as input the cryptographic public and private key pair used for both data encryption and cryptographic signing. In some embodiments, the process may take two separate public-private key pairs where the first pair is used for data encryption and the second pair may be used for transaction signing.

The output of the process of FIG. 6 is account generation request data comprised of two El-Gamal ciphertexts, a zero-knowledge proof, a transaction memo and a cryptographic signature.

In step 602 the CreateAccount function generates random values for use in generating ciphertexts using an account public key. In step 604, the function computes the ciphertext encrypting the asset identifier. In step 606, the function computes a zero-knowledge proof that the ciphertext computed at step 604 is well-formed.

In step 608, the function computes the ciphertext encrypting the account balance. In step 610, the function computers a zero-knowledge proof that the ciphertext computed at step 608 is correctly encrypting the value 0 (e.g., because the account is new and stores no tokens). In step 612, the function computes a zero-knowledge proof that the ciphertext computed at step 604 is correctly encrypting an asset type from the given set of public identifiers (e.g., indicating that the user account is associated with a known asset type rather than a made-up asset type).

In step 614, the function concatenates a final zero-knowledge proof including three different proofs generated at steps 606, 610 and 612. In step 616, the function generates a transaction memo that contains the account generation timestamp and user public key along with other auxiliary information. In step 618, the function computes the digital cryptographic signature for the account request data.

In step 620, the function outputs the account generation request data. The request data may be comprised of other data information as well. In some embodiments, the request data may store a data variable that indicates the current state of the request.

Figure 7:
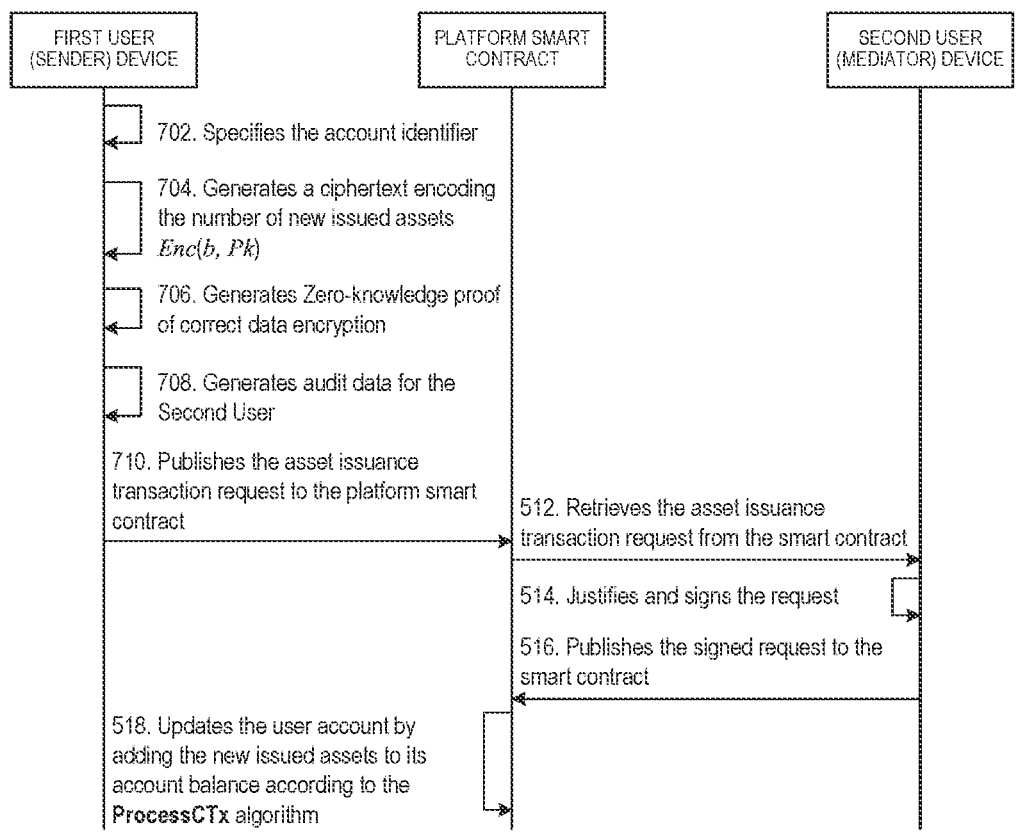
FIG. 7 is a flowchart that illustrates a flow diagram of a process for issuing a new asset in the platform.

FIG. 7 is a diagram illustrating an example sequence of steps for new asset issuance process initiated by a user's silent application running on a client device, validated by the second user, and registered by the system smart contract.

At step 702, the first user specifies the account where new assets will be issued. Each account is associated with some asset type and is paired with a public key. At step 704, the first user encrypts the number of new issued assets with the account public key. At step 706, the first user generates non-interactive zero-knowledge proofs that prove the ciphertext computed at step 704 is well-formed.

At step 708, the user generates audit tokens for the second user. The second user leverages the audit tokens to justify the validity of the overall issuance process. For example, the second user is enabled to check that the correct number of assets have been issued and for the correct asset type. The details of audit token generation and format are be described in FIG. 8.

At step 710, the user comprises the asset issuance transaction request, signs the request data comprised of a ciphertext, zero-knowledge proof, audit tokens and other auxiliary information and publishes the signed request data to the system smart contract.

At step 712, the second user application is retrieving the asset issuance transaction data from the system smart contract. At step 714, the second user validates (e.g., justifies) the asset issuance transaction and signs the transaction request data with the second user's private key.

At step 716, the second user's client application interacts with the system smart contract to publish the transaction data validated at step 714 to the smart contract. At step 718, the system smart contract processes the transaction request, which was submitted by the first user and was validated and signed by the second user, according to the system algorithm ProcessCTx, which is detailed in FIG. 12.

Figure 8:
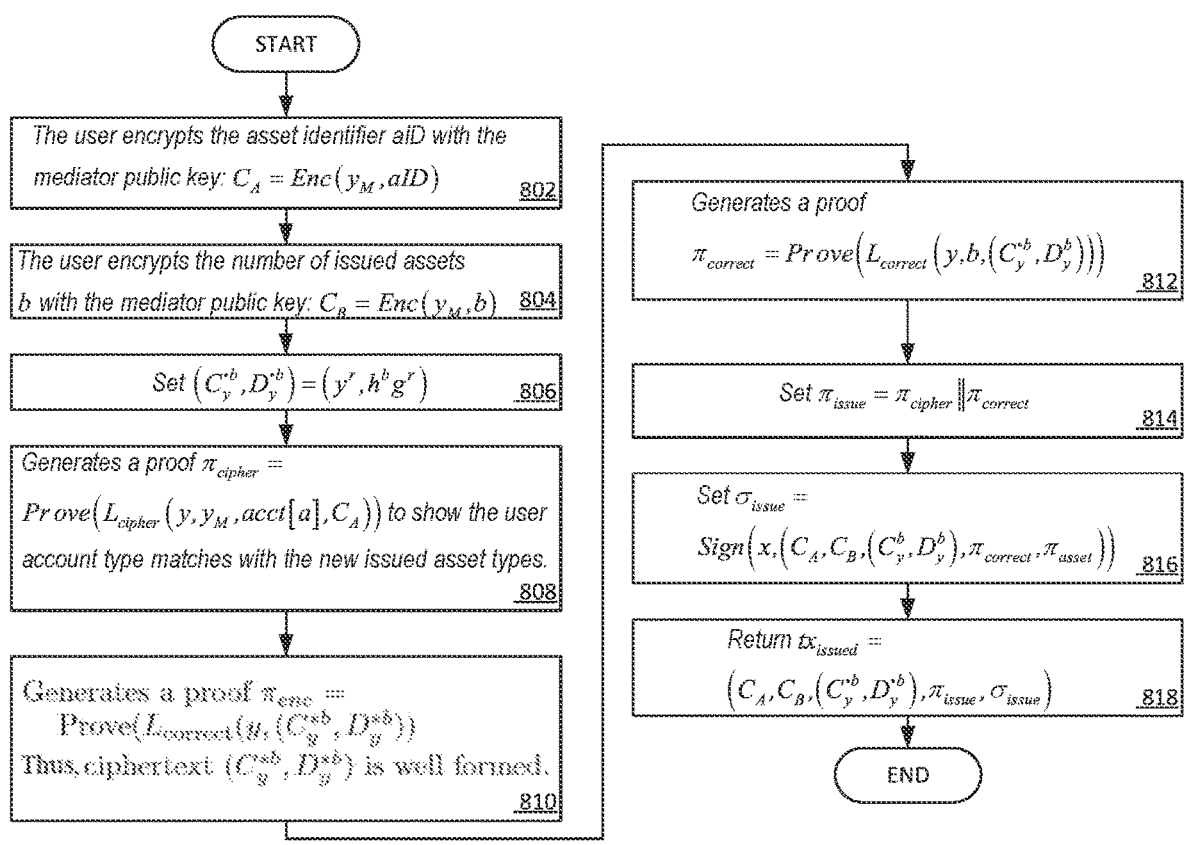
FIG. 8 is a flowchart that illustrates a user algorithm AssetIssuanceTx for generating a new asset issuance request.

FIG. 8 is a flowchart that illustrates a user algorithm CreateAssetIssuanceTx used to generate a new asset issuance registration request data. The algorithm takes as input the user's public and private key pair associated with the account, the number of shares to be issued, the target account data, the second user (trusted mediator) public key.

The output of this algorithm is a new asset issuance transaction request data comprised of an El-Gamal ciphertext, a zero-knowledge proof, audit tokens, a transaction memo and a cryptographic signature. In some embodiments, the request data may store a data variable, which indicates the current state of the request.

In step 802, the function computes the asset identifier with the second user public key. In step 804, the function computes the number of new issued shares with the second user public key. The resulting ciphertexts of steps 802 and 804 are part of the audit data, enabling the second user to validate the transaction request.

In step 806, the function sets the ciphertext encrypting the number of new issued assets to update the account later by adding the new issued shares to the account's balance. In step 808, the function generates a zero-knowledge proof that proves the ciphertext computed at step 802 is encoding the same asset identifier, as the subject account (e.g., the account being issued new assets). The proof of 808 is part of the audit data and is used by the second user to check if the new issued assets are corresponding to the type of subject account.

In step 810, the function computes a zero-knowledge proof that indicates the ciphertext computed at step 806 is well-formed. In step 812, the function computes a zero-knowledge proof that indicates the ciphertext computed at step 806 is encoding the same number as the ciphertext encoded at step 802. The proof of step 812 is part of the audit data and is used by the second user to check if the correct number of new assets will be issued.

In step 814, the function concatenates the different zero-knowledge proofs together to form a final proof of transaction validity. In step 816, the function generates the cryptographic signature for the transaction request data. In step 818, the function returns the new asset issuance request data. The request data may be comprised of other data information as well. In some embodiments, the request data may store a data variable that indicates the current state of the request.

Figure 9:
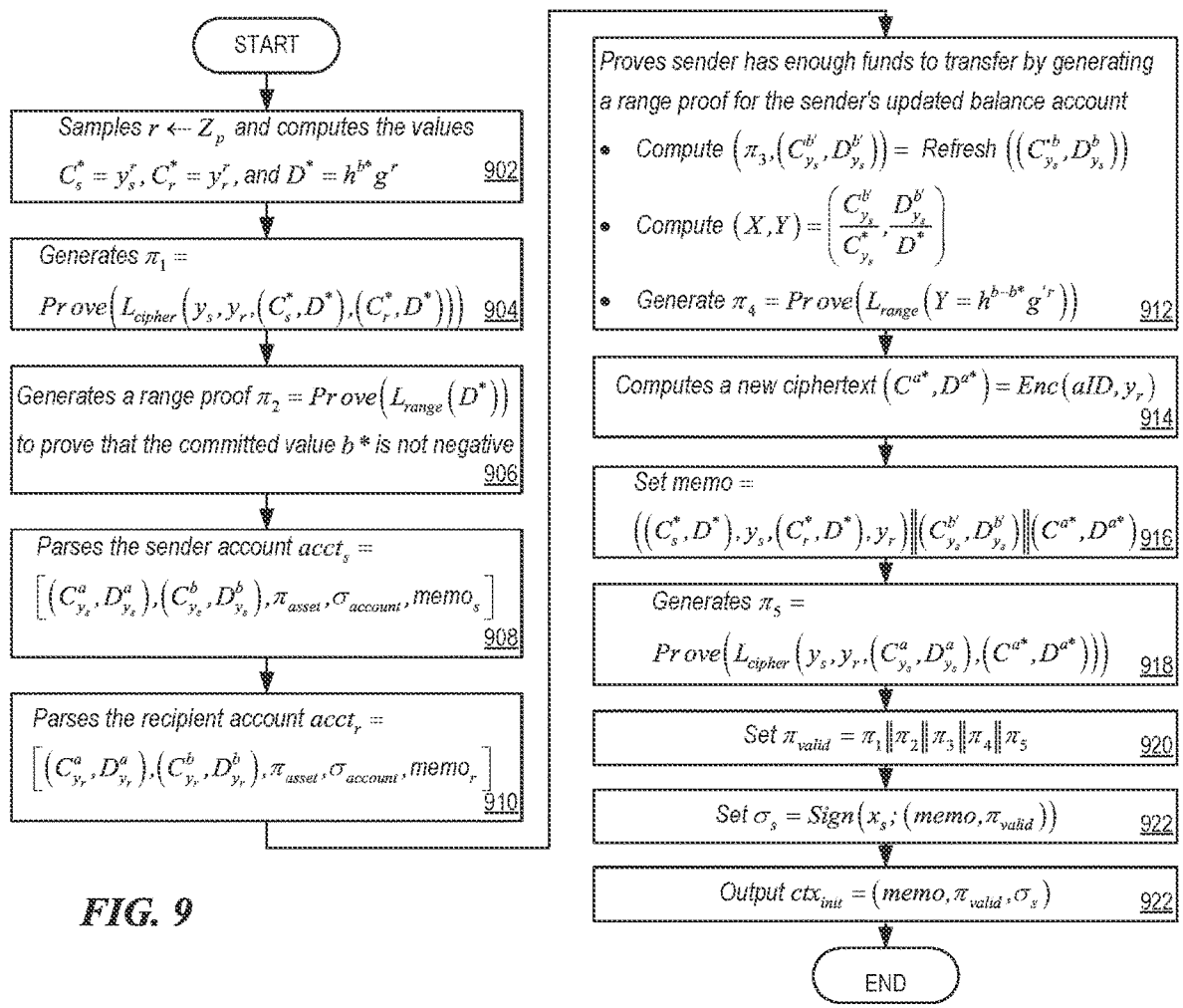
FIG. 9 is a flowchart that illustrates the user algorithm CreateCTx to initialize a confidential transaction request which hides the transferred asset amount and its asset type.

FIG. 9 is a flowchart that illustrates the user algorithm CreateCTx used to generate a new confidential transaction request data (e.g., transfer assets between users confidentially). As is shown in the figure, the algorithm takes as inputs the first user's (sender) public and private key, the second user's (recipient) public key, both the sender's and recipients public account data, the number of assets to be transferred As shown in FIG. 9, the output of the CreateCTx function is a new asset transfer transaction request data comprised of an El-Gamal ciphertexts encoding the number of transferred shares, a zero-knowledge proof, a transaction memo and a cryptographic signature. In some embodiments, the request data may store additional information, e.g. a data variable that indicates the current state of the request.

In step 902, the function computes two ciphertexts encoding the number of transferred shares. The first ciphertext encodes the amount to transfer with the first user(sender) public key. The second ciphertext encodes the amount to transfer with the second user(recipient) public key. In this manner, the second user is able to confirm the amount through private key decryption.

In step 904, the function generates a zero-knowledge proof of ciphertext equality, which proves these two ciphertexts computed at step 902 are encoding the same number. The proof of step 904 is part of the transaction validness proof and shows the same number of assets will be credited from the sender's account and debited to the recipient's account.

In step 906, the function generates a zero-knowledge range proof that indicates the ciphertexts computed at step 902 are encrypting a positive value. In step 908 and 910 the function retrieves the public account data of both sender and recipient (respectively) to refer to the certain fields of those accounts. In step 912, the function executes a proof that the sender has enough funds to transfer to the recipient. The proof of step 912 is indicated by showing the reminder of the sender account remains non-negative after crediting the number of transferred shares. Step 912 comprises three sub-steps.

912a. The first user computes a new ciphertext which provably encodes the same number as the ciphertext corresponding to the first user account balance. This is done through a cryptographic method of ciphertext refreshment.

912b. The first user homomorphically subtracts the number of transferred shares from the ciphertext encoding their current balance. The result is another ciphertext that encodes the first user account reminder after subtracting the transferred shares.

912c. The first user generates a zero-knowledge range proof indicating the ciphertext computed at 912b is encoding a non-negative value. These steps together ensure the first user has had enough funds to make the transfer.

In step 914, the function computes a new ciphertext that encodes the account asset type with the recipient public key. The ciphertext of step 914 is be used later to prove that the sender's and recipient's account are of the same type. In step 916, the function generates a transaction memo field comprised of all ciphertexts generated by the previous steps.

In step 918, the function generates a zero-knowledge proof that indicates that the ciphertext computed at step 914 is encoding the same value as the ciphertext retrieved (step 908) from the sender's account that encodes the sender's account asset type. The proof of step 918 is used to validate that the transferred asset type matches the sender's account.

In step 920, the function concatenates all different zero-knowledge proofs generated during the previous steps together to form the final proof of the transaction validness. In step 922, the function generates the cryptographic signature for the transaction request data. In step 924, the function returns the format of the new confidential transaction request data. The request data may be comprised of other data information as well. In some embodiments, the request data may store a data variable that indicates the current state of the request.

The request data is published to the system smart contract, where the recipient is enabled to finalize the transaction according to the FinalizeCTx algorithm. The receiver finalizes the transaction by proving that the incoming transaction asset type corresponds to its account asset type.

Figure 10:
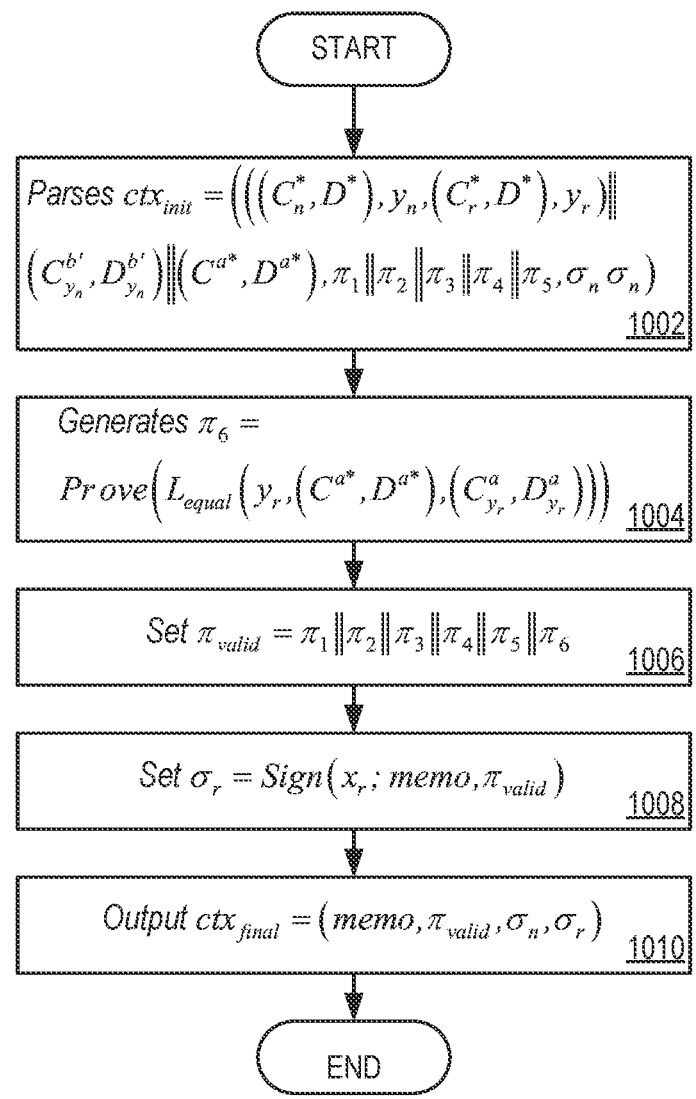
FIG. 10 is a flowchart that illustrates the user algorithm FinalizeCTx to finalize the generation of the confidential transaction request which hides the transferred asset amount and its asset type.

FIG. 10 is a flowchart that illustrates the user algorithm FinalizeCTx used to process the confidential transaction request generated by the CreateCTx algorithm (FIG. 9). As is shown in the figure, the algorithm takes as inputs a confidential transaction request data generated by the CreateCTx algorithm, the first user's (recipient) public and private key, the second user's (sender) public key, both the sender's and recipients public account data.

The output of the algorithm is finalized confidential asset transfer transaction request data that is processed further by the system ProcessCTx algorithm. The output of FinalizeCTx is comprised of all necessary cryptographic material to prove the transaction is well-formed and proves the sender has enough funds to transfer and the transfer is occurring between two accounts of the same type.

In step 1002, the function retrieves input transaction request data of the sender account data, the recipient account data, a ciphertext that encodes the transferred asset type with the recipient public key among other information. In step 1004, the function proves that the transferred asset type corresponds to the recipient account asset type. The proof of 1004 is the last piece of cryptographic information necessary to validate the sender's and recipient's accounts corresponding to the initiated transaction are of the same type and no exchange of assets of different types has occurred.

In step 1006, the function forms the final proof of the confidential transaction validness. The proof of 1006 is enough for checking that the transaction is valid. In step 1008, the function generate the cryptographic signature for the finalized transaction request data.

In step 1010, the function returns the format of the finalized confidential transaction request data. The request data may be comprised of other data information as well. In some embodiments, the request data may store a data variable that indicates the current state of the request. The request data is enough to be processed by the system algorithm ProcessCTx that processes the transaction by crediting the sender's account and debiting the same amount of funds to the recipient's account.

Figure 11:
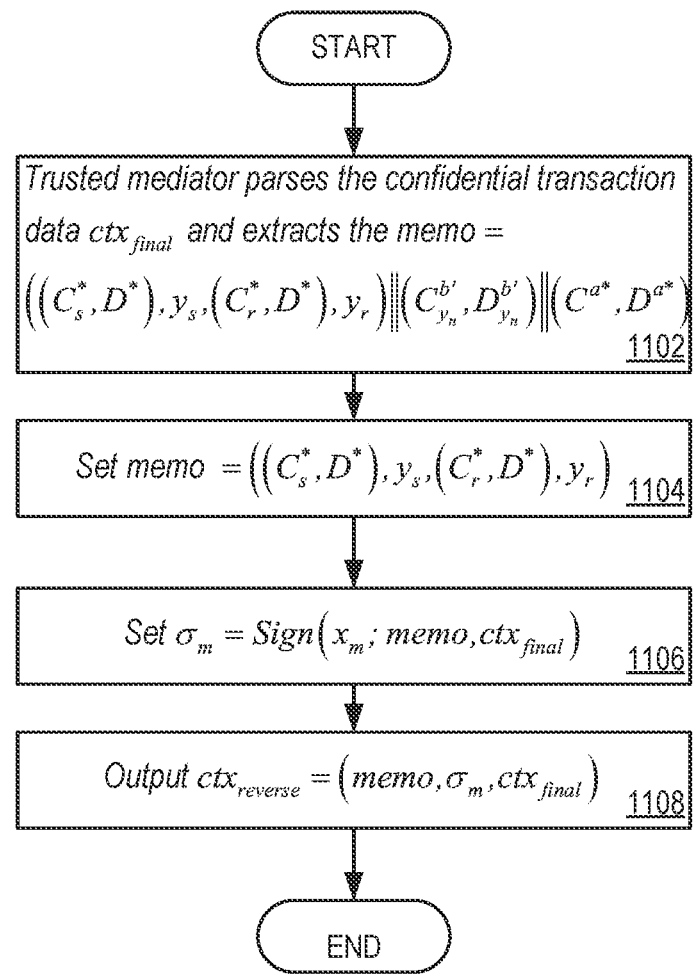
FIG. 11 is a flowchart that illustrates the user algorithm ReverseCTx to initialize a reverse transaction request which is linked to approved finalized transaction and will roll the transaction back without requiring other interaction from the transaction participating parties.

FIG. 11 is a flowchart that illustrates the user algorithm ReverseCTx used to reverse the confidential transaction request generated by the FinalizeCTx algorithm. As shown in the figure, the algorithm takes an input a finalized confidential transaction data generated by the FinalizeCTx that is subject to rolling back. It is assumed this algorithm is executed by a third user which acts as a trusted mediator. The user's private key is another input for the algorithm.

As shown in the figure, the output of ReverseCTx is a transaction request data which can be processed further by the ProcessCTx system algorithm.

In step 1102, the function retrieves the input transaction request data including the transaction memo containing the first operand ciphertext and the second operand ciphertexts that are homomorphically operated to update the transaction sender and recipient balances. In step 1104, the function forms the memo field of the request. The memo is comprised of the same two operand ciphertexts of the subject transaction request data.

In step 1106, Step 3 the function generates the cryptographic signature for the finalized transaction request data. In step 1108, the function returns the format of the finalized confidential transaction request data. The request data may be comprised of other data information as well.

FIG. 12 is a flowchart that illustrates the system algorithm ProcessCTx used to process the confidential transaction requests generated by either of the CreateAssetIssuanceTx, FinalizeCTx or ReverseCTx algorithms.

As shown in the figure, the algorithm takes an input a finalized confidential transaction request data. It is assumed that the request data is verified by miners and is ready to be processed by the system algorithms. The processing of this request data results in account balance changes on the ledger.

In step 1202, the function extracts the transaction sender and recipient accounts and their current balance ciphertexts acct_(Y_S) [b] and acct_(Y_R) [b]. Note that if the subject transaction request data is of the type ctx_issue, then there is no recipient account. In step 1204 the function processes the transaction request data of type ctx_final. The first operand ciphertext taken from the memo is homomorphically subtracted from the sender balance ciphertext, and the second operand ciphertext is homomorphically added to the recipient balance ciphertext.

In step 1206, the function processes the transaction request data of type ctx_reverse. The first operand ciphertext extracted from the transaction request memo is homomorphically added to the sender balance ciphertext, and the second operand ciphertext is homomorphically subtracted from the recipient balance ciphertext. These changes update the transaction sender and recipient balances by rolling back the finalized transaction.

In step 1208, the function processes the transaction request data of type ctx_issue. The first operand ciphertext is homomorphically added to the transaction issuer account balance. This processing will update the transaction issuer balance by the number of new issued assets of the given type.

Figure 13:
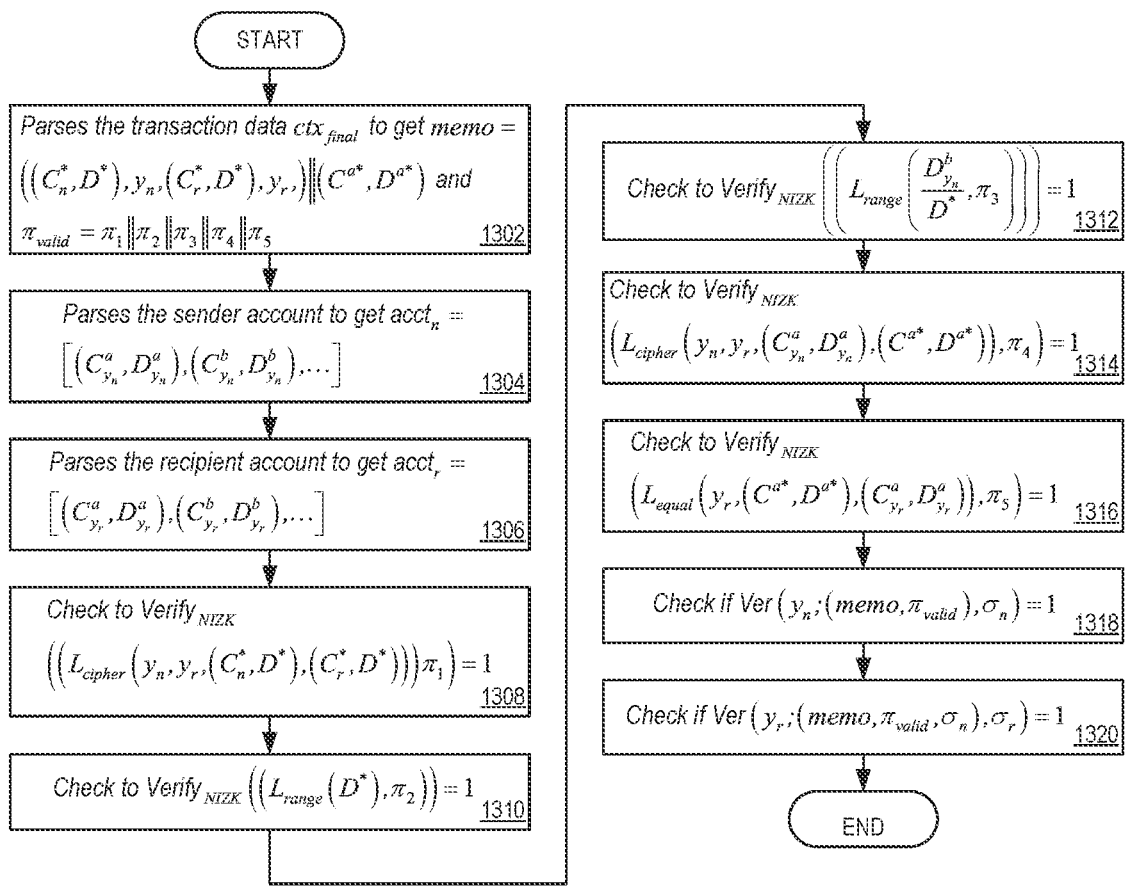
FIG. 13 is a flowchart that illustrates the user algorithm VerifyCTx implemented in a platform smart contract to verify the validity of finalized confidential transaction request data.

FIG. 13 is a flowchart that illustrates the VerifyCTx algorithm that is used by the blockchain network participants to verify the validity of transaction requests. The verification steps imply the consecutive verification of all zero-knowledge proofs and cryptographic signatures comprising the transaction request.

FIGS. 14A-D illustrate the cryptographic zero-knowledge proof mechanisms used in the system algorithm construction. Although these methods are well-known cryptographic techniques, these proofs are provided sake of completeness of the protocol description.

Figure 15:
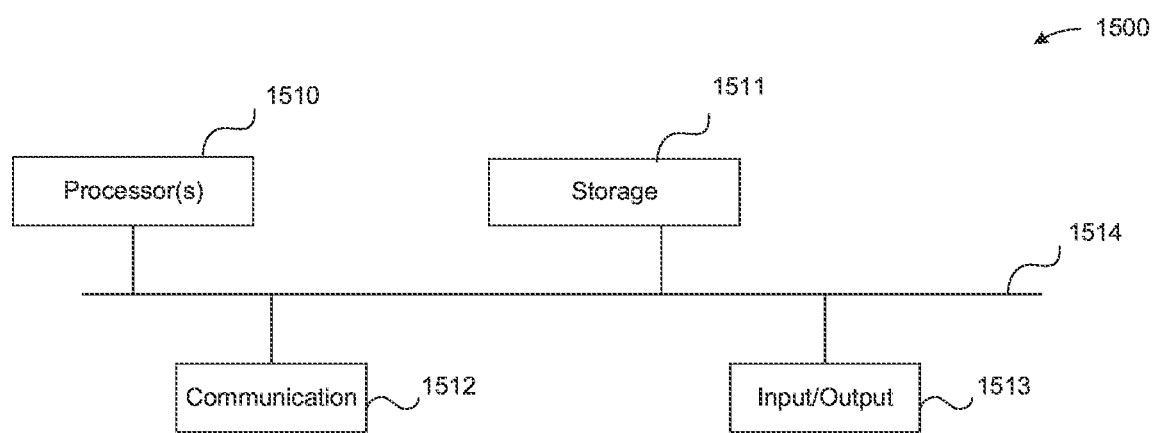
FIG. 15 is a block diagram of an exemplary computing system.

FIG. 15 is a high-level block diagram showing an example of a processing device 1500 that can represent a system to run any of the methods/algorithms described above. A system may include two or more processing devices such as represented in FIG. 15, which may be coupled to each other via a network or multiple networks. A network can be referred to as a communication network.

In the illustrated embodiment, the processing device 1500 includes one or more processors 1510, memory 1511, a communication device 1512, and one or more input/output (I/O) devices 1513, all coupled to each other through an interconnect 1514. The interconnect 1514 may be or include one or more conductive traces, buses, point-to-point connections, controllers, scanners, adapters and/or other conventional connection devices. Each processor 1510 may be or include, for example, one or more general-purpose programmable microprocessors or microprocessor cores, microcontrollers, application specific integrated circuits (ASICs), programmable gate arrays, or the like, or a combination of such devices. The processor(s) 1510 control the overall operation of the processing device 1500. Memory 1511 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1511 may store data and instructions that configure the processor(s) 1510 to execute operations in accordance with the techniques described above. The communication device 1512 may be or include, for example, an Ethernet adapter, cable modem, Wi-Fi adapter, cellular transceiver, Bluetooth transceiver, or the like, or a combination thereof. Depending on the specific nature and purpose of the processing device 1500, the I/O devices 1513 can include devices such as a display (which may be a touch screen display), audio speaker, keyboard, mouse or another pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 1500 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Processing device 1500 may be described as a "node." A "node" or "network node" may refer to a connection point in a communication network. A network node can be a physical electronic device that is capable of creating, receiving, or transmitting data. In some embodiments, a network node may be a computing device within a record-keeping network (e.g., a blockchain network). A network node may be able to create a data package (e.g., a data payload), transfer a data package, receive a data package, validate a data package, access a central record, and/or perform any other suitable functions. Different types of network nodes may be able to perform different sets of functions within a recording network. In some embodiments, a network node may be associated with and/or operated by a resource provider such as an online service provider, a content provider, a certificate authority, a financial institution (e.g., a bank), a merchant, a transaction processing network, or any other suitable entity.

Examples

1. A method comprising:
    initiating a cryptographic interaction between a first user and a second user, wherein the first user and the second user each having a respective cryptographic key pair including a public key and a private key, the cryptographic interaction including a first operand and a second operand;
    encrypting the first operand with a first public key associated with the first user, thereby generating a first ciphertext;
    encrypting the second operand with a second public key associated with the second user, thereby generating a second ciphertext;
    confirming, via zero-knowledge proof, that the first ciphertext and the second ciphertext having matching plaintext values; and
    in response to said confirming, appending the cryptographic interaction to an immutable public ledger with the first ciphertext and the second ciphertext.
2. The method of example 1, further comprising:
    establishing a first user profile associated with the first user that includes a first account ciphertext and a second account ciphertext, wherein the first account ciphertext encrypts an amount associated with the first user and the second account ciphertext encrypts a type associated with the first user profile.
3. The method of example 2, wherein the cryptographic interaction includes a third operand, the method further comprising:
    encrypting the third operand with the second public key associated with the second user, thereby generating a third ciphertext;
    identifying, via zero-knowledge proof, that the third ciphertext and the second account ciphertext having matching plaintext types; and
    wherein said appending further includes the third ciphertext.
4. The method of example 3, further comprising:
    establishing a second user profile associated with the second user;
    in response to said confirming and identifying, executing the cryptographic interaction where a first value associated with the first operand and second operand is shifted from the first user profile to the second user profile, the first value is of the type associated with the first user profile;
    simultaneously with said executing, updating the first account ciphertext to encrypt the first value subtracted from the amount associated with the first user.
5. The method of any of examples 1 to 4, wherein said confirming further comprises:
    confirming, via zero-knowledge proof, that the first operand or the second operand are non-negative values.
6. The method of any of examples 4 or 5, wherein said confirming further comprises:
    confirming, via zero-knowledge proof, that amount associated with the first user after said executing is non-negative.
7. The method of any of examples 1 to 6, wherein said encrypting makes use of a nonce.
8. The method of any of examples 1 to 7, wherein the first user provides the second operand and the second user provides the first operand.
9. The method of any examples 3 to 9, wherein the first user provides the first operand, the second operand, and the third operand.
10. A method comprising:
    initiating a cryptographic transaction between a first user and a second user, wherein the first user and the second user each having a respective cryptographic key pair including a public key and a private key, the cryptographic transaction including a first operand, a second operand, and a third operand wherein the first and second operands are associated with an amount of the cryptographic transaction and the third operand is associated with an asset type of the cryptographic transaction;
    encrypting the first operand with a first public key associated with the first user, thereby generating a first ciphertext;
    encrypting the second operand and the third operand with a second public key associated with the second user, thereby generating a second ciphertext and a third ciphertext respectively;
    confirming, via zero-knowledge proof, that the first ciphertext and the second ciphertext having matching plaintext values; and
    in response to said confirming, executing the cryptographic transaction on an immutable public ledger wherein the first ciphertext, the second ciphertext, and the third ciphertext are published, and wherein the amount of the cryptographic transaction is transferred from the first user to the second user.
11. The method of example 10, further comprising:
    establishing a first user wallet associated with the first user that includes a first account ciphertext and a second account ciphertext, wherein the first account ciphertext encrypts an amount stored by the first user wallet and the second account ciphertext encrypts an asset type associated with the first user wallet.
12. The method of example 11, further comprising:
    identifying, via zero-knowledge proof, that the third ciphertext and the second account ciphertext having matching plaintext types.
13. The method of any of examples 10 to 12, wherein said confirming further comprises:
    confirming, via zero-knowledge proof, that the first operand or the second operand are non-negative values.
14. The method of any of examples 11 to 13, wherein said confirming further comprises:
    confirming, via zero-knowledge proof, that amount associated with the first user after said executing is non-negative.

15. The method of any of examples 10 to 14 wherein said executing requires signatures from a first private key associated with the first user and a second private key associated with the second user.

16. A system comprising:
a first node on a cryptographic network, the first node associated with a first user having a first cryptographic wallet and wherein the first user is identified by a first cryptographic keypair including a first public key and a first private key;
a second node on a cryptographic network, the second node associated with a second user having a second cryptographic wallet and wherein the second user is identified by a second cryptographic keypair including a second public key and a second private key; and
a distributed, immutable public ledger configured to store cryptographic transaction records;
wherein the first node is configured to initiate a cryptographic transaction between the first user and the second user, and wherein the first node is configured to generate a first operand, a second operand, and a third operand, wherein the first and second operands are associated with an amount of the cryptographic transaction and the third operand is associated with an asset type of the cryptographic transaction;
wherein the first node is configured to encrypt the first operand with the first public key thereby generating a first ciphertext, and encrypt the second operand and the third operand with the second public key thereby generating a second ciphertext and a third ciphertext respectively, and to confirm, via zero-knowledge proof, that the first ciphertext and the second ciphertext have matching plaintext values;
wherein the second node is configured to verify that the third ciphertext matches an asset type associated with the second cryptographic wallet; and
wherein the distributed immutable public ledger is configured to execute the cryptographic transaction in response to said confirmation by the second node, and wherein the distributed immutable public ledger is configured to publish the first ciphertext, the second ciphertext, and the third ciphertext, and wherein the amount of the cryptographic transaction is transferred from the first cryptographic wallet to the second cryptographic wallet.

17. The system of example 16, wherein the first cryptographic wallet further includes a first account ciphertext and a second account ciphertext, wherein the first account ciphertext encrypts an amount stored by the first user wallet and the second account ciphertext encrypts an asset type associated with the first user wallet.

18. The system of any of examples 16 or 17, wherein the second node is further configured to identify, via zero-knowledge proof, that the third ciphertext and the second account ciphertext having matching plaintext types.

19. The system of any of examples 16 to 18, wherein the second node is further configured to confirm, via zero-knowledge proof, that the first operand or the second operand are non-negative values.

20. The system of any of examples 17 to 19, wherein the second node is further configured to confirm, via zero-knowledge proof, that amount associated with the first user after said execution of the cryptographic transaction is non-negative.

21. The system of any of examples 16 to 19 wherein said the distributed immutable public ledger requires signatures from the first private key and the second private key prior to executing the cryptographic transaction.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method comprising:
initiating a cryptographic blockchain exchange between a first user and a second user, wherein the first user and the second user each have a respective cryptographic key pair including a public key and a private key;
establishing a first user profile associated with the first user that includes a first account ciphertext and a second account ciphertext, wherein the first account ciphertext encrypts an amount associated with the first user profile and the second account ciphertext encrypts an asset type associated with the first user profile;
establishing a second user profile associated with the second user that includes a third account ciphertext, wherein the third account ciphertext encrypts an asset type associated with the second user profile;
providing to the cryptographic blockchain exchange a first operand, a second operand, and a third operand, wherein the first and second operands originate from different respective sources;
encrypting the first operand with a first public key associated with the first user, thereby generating a first ciphertext, wherein the first operand is associated with an amount of the cryptographic blockchain exchange;
encrypting the second operand with a second public key associated with the second user, thereby generating a second ciphertext, wherein the second operand is associated with an amount of the cryptographic blockchain exchange;
encrypting the third operand with the second public key associated with the second user, thereby generating a third ciphertext, wherein the third operand is associated with an asset type of the cryptographic blockchain exchange;
confirming, via zero-knowledge proof, that the first ciphertext and the second ciphertext have matching plaintext amounts;
identifying, via zero-knowledge proof, that the third ciphertext and the second account ciphertext associated with the first user have matching plaintext asset types;
verifying, via zero-knowledge proof, that the third ciphertext and the third account ciphertext associated with the second user have matching plaintext asset types;
in response to said confirming, identifying, and verifying, appending the cryptographic blockchain exchange to an immutable public ledger with the first ciphertext, the second ciphertext, and the third ciphertext; and
in response to identifying the third ciphertext has a matching plaintext asset type with the second account ciphertext associated with the first user, and verifying the third ciphertext has a matching plaintext asset type with the third account ciphertext associated with the second user, executing the cryptographic blockchain exchange such that a first value associated with the amount of the first operand is shifted from the first user profile to the second user profile.

2. The method of claim 1, further comprising:
simultaneously with executing the cryptographic blockchain exchange, updating the first account ciphertext to encrypt the first value subtracted from the amount associated with the first user.

3. The method of claim 1, wherein said confirming further comprises:
confirming, via zero-knowledge proof, that the first operand or the second operand are non-negative values.

4. The method of claim 2, wherein said confirming further comprises:
confirming, via zero-knowledge proof, that amount associated with the first user after said executing is non-negative.

5. The method of claim 1, wherein said encrypting makes use of a nonce.

6. The method of claim 1, wherein the first user provides the second operand and the second user provides the first operand.

7. The method of claim 1, wherein the first user provides the first operand, the second operand, and the third operand.

8. A method comprising:
initiating a cryptographic blockchain exchange between a first user and a second user, wherein the first user and the second user each having a respective cryptographic key pair including a public key and a private key, the cryptographic blockchain exchange including a first operand, a second operand, and a third operand wherein the first and second operands are associated with an amount of the cryptographic blockchain exchange and the third operand is associated with an asset type of the cryptographic blockchain exchange;
establishing a first account asset type ciphertext associated with the first user, wherein the first account asset type ciphertext encrypts an asset type associated with the first user;
establishing a second account asset type ciphertext associated with the second user, wherein the second account asset type ciphertext encrypts an asset type associated with the second user;
providing to the cryptographic blockchain exchange the first operand, the second operand, and the third operand, wherein the first and second operands originate from different respective sources;
encrypting the first operand with a first public key associated with the first user, thereby generating a first ciphertext;
encrypting the second operand and the third operand with a second public key associated with the second user, thereby generating a second ciphertext and a third ciphertext respectively;
confirming, via zero-knowledge proof, that the first ciphertext and the second ciphertext have matching plaintext values;
identifying, via zero-knowledge proof, that the third ciphertext and the first account asset type ciphertext associated with the first user have matching plaintext asset types;
verifying, via zero-knowledge proof, that the third ciphertext and the second account ciphertext associated with the second user have matching plaintext asset types; and in response to said confirming, identifying, and verifying, executing the cryptographic blockchain exchange on an immutable public ledger wherein the first ciphertext, the second ciphertext, and the third ciphertext are published, and wherein the amount of the cryptographic blockchain exchange is transferred from the first user to the second user.

9. The method of claim 8, further comprising:
establishing a first user wallet associated with the first user that includes a first account amount ciphertext and the first account asset type ciphertext, wherein the first account amount ciphertext encrypts an amount stored by the first user wallet and the first account asset type ciphertext encrypts an asset type associated with the first user wallet.

10. The method of claim 8, wherein said confirming further comprises:
confirming, via zero-knowledge proof, that the first operand or the second operand are non-negative values.

11. The method of claim 9, wherein said confirming further comprises:
confirming, via zero-knowledge proof, that the amount associated with the first user after said executing is non-negative.

12. The method of claim 8, wherein said executing requires signatures from the first private key associated with the first user and the second private key associated with the second user.

13. A system comprising:
a first node on a cryptographic network, the first node associated with a first user having a first cryptographic wallet and wherein the first user is identified by a first cryptographic keypair including a first public key and a first private key;
a second node on a cryptographic network, the second node associated with a second user having a second cryptographic wallet and wherein the second user is identified by a second cryptographic keypair including a second public key and a second private key; and
a distributed, immutable public ledger configured to store cryptographic transaction records;
wherein the first node is configured to initiate a cryptographic blockchain exchange between the first user and the second user, and wherein the first node is configured to receive values associated with a first operand, a second operand, and a third operand and the values associated with the first operand and the second operand originate from different users, wherein the first and second operands are associated with an amount of the cryptographic blockchain exchange and the third operand is associated with an asset type of the cryptographic blockchain exchange;
wherein the first node is configured to establish a first account asset type ciphertext associated with the first user, wherein the first account asset type ciphertext encrypts an asset type associated with the first cryptographic wallet;
wherein the second node is configured to establish a second account asset type ciphertext associated with the second user, wherein the second account asset type ciphertext encrypts an asset type associated with the second cryptographic wallet;
wherein the first node is configured to encrypt the first operand with the first public key thereby generating a first ciphertext, and encrypt the second operand and the third operand with the second public key thereby generating a second ciphertext and a third ciphertext respectively, and to confirm, via zero-knowledge proof, that the first ciphertext and the second ciphertext have matching plaintext values, and to identify, via zero-knowledge proof, that the third ciphertext and the first account asset type ciphertext have matching plaintext asset types;

wherein the second node is configured to verify that the third ciphertext and the second account asset type ciphertext have matching plaintext asset types; and wherein the distributed immutable public ledger is configured to execute the cryptographic blockchain exchange in response to said verification by the second node, and wherein the distributed immutable public ledger is configured to publish the first ciphertext, the second ciphertext, and the third ciphertext, and wherein the amount of the cryptographic blockchain exchange is transferred from the first cryptographic wallet to the second cryptographic wallet.

14. The system of claim 13, wherein the first cryptographic wallet further includes a first account amount ciphertext and the first account asset type ciphertext, wherein the first account amount ciphertext encrypts an amount stored by the first user wallet and the first account type ciphertext encrypts the asset type associated with the first user wallet.

15. The system of claim 13, wherein the second node is further configured to confirm, via zero-knowledge proof, that the first operand or the second operand are non-negative values.

16. The system of claim 14, wherein the second node is further configured to confirm, via zero-knowledge proof, that amount associated with the first user after said execution of the cryptographic blockchain exchange is non-negative.

17. The system of claim 13, wherein said the distributed immutable public ledger requires signatures from the first private key and the second private key prior to executing the cryptographic blockchain exchange.

* * * * *